United States Patent
Chen

(10) Patent No.: US 8,503,838 B2
(45) Date of Patent: Aug. 6, 2013

(54) TWO-PART OPTICAL COUPLING SYSTEM HAVING AN AIR GAP THEREIN FOR REFLECTING LIGHT TO PROVIDE OPTICAL FEEDBACK FOR MONITORING OPTICAL OUTPUT POWER LEVELS IN AN OPTICAL TRANSMITTER (TX)

(75) Inventor: Ye Chen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 330 days.

(21) Appl. No.: 12/882,446

(22) Filed: Sep. 15, 2010

(65) Prior Publication Data
US 2012/0063721 A1    Mar. 15, 2012

(51) Int. Cl.
G02B 6/26    (2006.01)
G02B 6/36    (2006.01)
G02B 6/32    (2006.01)
G02B 6/42    (2006.01)

(52) U.S. Cl.
USPC .................................. 385/31; 385/33; 385/89

(58) Field of Classification Search
USPC ................. 385/14, 31, 33, 34, 88, 89, 92, 93, 385/94
See application file for complete search history.

(56) References Cited

U.S. PATENT DOCUMENTS

| 4,421,383 A | 12/1983 | Carlsen |
| 5,743,785 A | 4/1998 | Lundberg et al. |
| 6,005,991 A | 12/1999 | Knasel |
| 6,085,003 A | 7/2000 | Knight |
| 6,442,323 B1 | 8/2002 | Sorosiak |
| 6,488,026 B2 | 12/2002 | Lauer |
| 6,821,028 B2 | 11/2004 | Morris et al. |
| 6,850,671 B2 | 2/2005 | Carnevale et al. |
| 6,886,988 B2 | 5/2005 | Brown et al. |
| 6,888,988 B2 | 5/2005 | Vancoille et al. |
| 6,895,147 B2 | 5/2005 | Posamentier |
| 7,245,813 B2 | 7/2007 | Brown et al. |
| 7,280,732 B2 | 10/2007 | Granger et al. |
| 7,296,935 B1 | 11/2007 | Childers et al. |
| 7,653,102 B2 | 1/2010 | Miller |
| 7,841,777 B2 | 11/2010 | Howard et al. |
| 8,032,003 B2 | 10/2011 | Childers et al. |
| 8,052,334 B2 | 11/2011 | Childers et al. |
| 8,104,973 B2 | 1/2012 | Howard et al. |

(Continued)

FOREIGN PATENT DOCUMENTS

JP    2004-212847    7/2004

*Primary Examiner* — Charlie Peng
*Assistant Examiner* — Mary El Shammaa

(57) ABSTRACT

A two-part optical coupling system is provided for use in an optical transmitter (TX) module. The two-part optical coupling system has first and second optical parts and an air gap at the interface between the two optical parts. A portion of the light produced by a laser diode of the optical TX module is refracted at the air gap and is coupled by the optical coupling system into an end of an optical fiber. A second portion of the light produced by the laser diode is reflected by the air gap and is coupled by the optical coupling system onto a monitor photodiode of the optical TX. The electrical signal produced by the monitor photodiode may be used to monitor and adjust the optical output power level of the laser diode. Because the air gap is formed at the interface between the first and second optical parts, the process of forming the air gap can be incorporated into the optical coupling system manufacturing process without increasing the cost of the manufacturing process.

17 Claims, 2 Drawing Sheets

U.S. PATENT DOCUMENTS

| | | |
|---|---|---|
| 2002/0003824 A1 | 1/2002 | Lo et al. |
| 2003/0223725 A1* | 12/2003 | Laporte et al. ............... 385/135 |
| 2004/0096165 A1 | 5/2004 | Childers et al. |
| 2006/0045409 A1* | 3/2006 | Tatum et al. .................... 385/12 |
| 2006/0115217 A1 | 6/2006 | Childers et al. |
| 2006/0115218 A1 | 6/2006 | Childers et al. |
| 2006/0153570 A1* | 7/2006 | Nelson et al. ................ 398/135 |
| 2006/0210225 A1 | 9/2006 | Fujiwara et al. |
| 2007/0133923 A1* | 6/2007 | Park et al. ...................... 385/14 |
| 2009/0140047 A1 | 6/2009 | Yu et al. |
| 2009/0179492 A1* | 7/2009 | Ishibashi ........................ 307/43 |
| 2009/0196631 A1 | 8/2009 | Daghighian et al. |
| 2010/0135618 A1 | 6/2010 | Howard et al. |
| 2010/0202735 A1 | 8/2010 | Childers et al. |
| 2010/0215319 A1 | 8/2010 | Childers et al. |
| 2011/0206324 A1 | 8/2011 | Childers et al. |
| 2011/0229678 A1 | 9/2011 | Childers et al. |

* cited by examiner

TWO-PART OPTICAL COUPLING SYSTEM HAVING AN AIR GAP THEREIN FOR REFLECTING LIGHT TO PROVIDE OPTICAL FEEDBACK FOR MONITORING OPTICAL OUTPUT POWER LEVELS IN AN OPTICAL TRANSMITTER (TX)

TECHNICAL FIELD OF THE INVENTION

The invention relates to an optical coupling system that provides optical feedback for use in monitoring optical output power levels in an optical transmitter module.

BACKGROUND OF THE INVENTION

An optical transmitter (TX) module is an optical communications device used to transmit optical data signals over optical waveguides (e.g., optical fibers) of an optical communications network. An optical TX module includes input circuitry, a laser driver circuit, one or more laser diodes, and an optical coupling system. The input circuitry typically includes buffers and amplifiers for conditioning an input data signal, which is then provided to the laser driver circuit. The laser driver circuit receives the conditioned input data signal and produces electrical modulation and bias current signals, which are provided to the laser diodes to cause them to produce optical data signals having logic 1 and logic 0 intensity levels. The optical data signals are then directed by the optical coupling system onto the ends of respective transmit optical fibers held within a connector that mates with the optical transceiver module.

The optical TX typically also includes a closed loop optical output power feedback system that monitors and controls the modulation and/or bias currents of the laser diodes in such a way that the average optical output power levels of the laser diodes are maintained within designed range. In closed loop optical output power feedback systems, the optical coupling system of the TX module couples a portion of the light produced by the laser diodes onto respective monitor photodiodes in the TX module. The monitor photodiodes produce electrical signals corresponding to the optical output power levels of the laser diodes. Electrical feedback circuitry of the feedback system receives the electrical signals produced by the monitor photodiodes and produces control signals that are then used to adjust the modulation and/or bias currents of the laser diodes such that their average optical output power levels are maintained at designed levels.

Many optical coupling systems currently in use in optical TX modules incorporate relatively elaborate optical features for providing optical feedback, such as gratings and coated angled surfaces that diffract a portion of the light produced by the laser diodes to divert a portion of the light onto the optical feedback monitoring path. Manufacturing these types of optical features tends to be difficult and costly due to the complexity of the manufacturing processes.

A need exists for an optical coupling system for use in an optical TX module for optical feedback monitoring that can be manufactured at relatively low costs.

SUMMARY OF THE INVENTION

The invention is directed to a two-part optical coupling system for use in an optical TX module and a method for using a two-part optical coupling system in an optical TX module to provide optical feedback. The two-part optical coupling system comprises a first optical part and a second optical part. The first and second optical parts each have at least an upper surface and a lower surface and comprise a material that is transparent to a primary wavelength of a laser diode of the optical TX module. The upper surface of the first optical part and/or the lower surface of the second optical part have an indentation formed therein that forms an air gap in the optical coupling system at a location where the upper surface of the first optical part interfaces with the lower surface of the second optical part. A first portion of light, L1, produced by the laser diode is refracted by the air gap and a second portion of the light, L2, produced by the laser diode is reflected by the air gap. The reflected second portion of light L2 is coupled by the two-part optical coupling system onto a monitor photodiode of the optical TX module. The first portion of the light L1 is coupled by the two-part optical coupling system into an end of an optical fiber.

The method comprises: providing a two-part optical coupling system having first and second optical parts with an air gap existing at an interface between the first and second optical parts; producing light of a primary wavelength with a laser diode of the optical TX module, directing light produced by the laser diode of the optical coupling system onto the air gap such that a first portion of the light, L1, is refracted by the air gap and such that a second portion of light L2 is reflected by the air gap; coupling the reflected second portion of the light L2 onto a monitor photodiode of the optical TX module; and coupling the refracted first portion of the light L1 into an end of an optical fiber.

These and other features and advantages of the invention will become apparent from the following description, drawings and claims.

DETAILED DESCRIPTION OF AN ILLUSTRATIVE EMBODIMENT

In accordance with the invention, a two-part optical coupling system is provided that has first and second optical parts and an air gap at the interface between the two optical parts. A portion of the light produced by a laser diode of the optical TX module is refracted at the air gap and is coupled by the optical coupling system into an end of an optical fiber. A second portion of the light produced by the laser diode is reflected by the air gap and is coupled by the optical coupling system onto a monitor photodiode of the optical TX. The electrical signal produced by the monitor photodiode may be used to monitor and adjust the optical output power level of the laser diode. Because the air gap is formed at the interface between the first and second optical parts, the process of forming the air gap can be incorporated into the optical coupling system manufacturing process without increasing the cost of the manufacturing process, as will be described below in more detail.

With recent developments in optical connector design, optical coupling systems are now being formed in two separate parts: one part being on the laser diode chip itself and the other part being on the fiber assembly that holds the ends of the optical fibers. The part that is on the laser diode chip collimates the light produced by the laser diode and the part that is on the fiber assembly focuses the collimated light into the end of an optical fiber. The two-part design makes it possible to easily form an air gap in the optical coupling system at the interface between the two parts during the manufacturing process without increasing the costs of the manufacturing process.

In the past, forming an air gap in a single-part optical coupling system presented difficulties. In particular, forming an air gap inside of a single piece of material mechanically weakens the piece of material, which can result in a reduction in manufacturing yield. In addition, it is difficult from a manufacturing standpoint to insert an air gap into a piece of bulk material. Consequently, with single-part optical coupling systems that have been used in the past in optical TX modules, it has been difficult or impractical to use an air gap to reflect a portion of the light produced by the laser diode onto a monitor photodiode. For this and other reasons, the aforementioned diffractive gratings and coated angled surfaces have been used for this purpose.

In accordance with the invention, an indentation is formed in one or both parts of the two-part optical coupling system at locations at which the parts interface with each other to form an air gap. Forming the indentation or indentations is a relatively easy process that can be incorporated into the molding process that is used to manufacture the optical coupling system at no additional cost. A few illustrative, or exemplary, embodiments of the two-part optical coupling system will now be described with reference to FIGS. 1 and 2.

Figure 1:
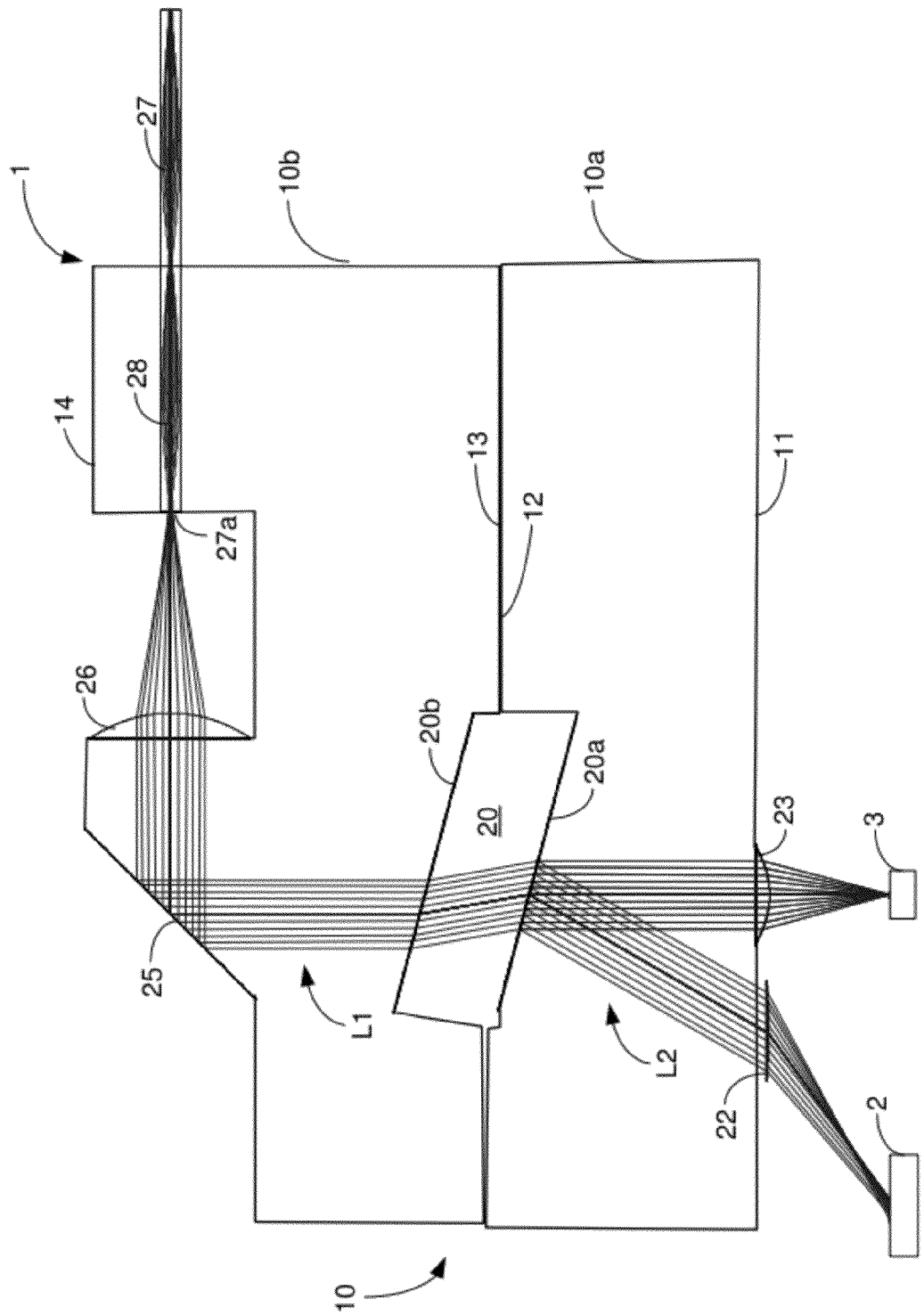
FIG. 1 illustrates a side plan view of an optical TX module that incorporates a two-part optical coupling system in accordance with an illustrative embodiment.

FIG. 1 illustrates a side plan view of an optical TX module 1 that incorporates a two-part optical coupling system 10 in accordance with an illustrative embodiment. For ease of illustration, a single laser diode 2 and a single monitor photodiode 3 are shown in FIG. 1, although the invention applies to multi-channel optical TX modules as well as single-channel optical TX modules. The two-part optical coupling system 10 includes a first optical part 10a and a second optical part 10b. The first optical part 10a has at least a lower surface 11 and an upper surface 12. Likewise, the second optical part 10b has at least a lower surface 13 and an upper surface 14. The upper surface 12 of the first optical part 10a and the lower surface 13 of the second optical part 10b have indentations 20a and 20b formed therein such that when the optical coupling system 10 is assembled, the indentations 20a and 20b together form an air gap 20 at the interface where the upper and lower surfaces 12 and 13 meet.

A collimating lens 22 and a focusing lens 23 are disposed on, in, or in close proximity to, the lower surface 11 of the first optical part 10a. A reflective surface (typically created for total internal reflection) 25 and a focusing lens 26 are disposed on, in, or in close proximity to, the upper surface 14 of the second optical part 10b. An optical fiber 27 is secured within an opening 28 formed in the second optical part 10b.

The optical TX 1 operates as follows. When the laser diode 3 is modulated, the laser diode 3 produces an optical signal. The optical signal produced by the laser diode 3 is collimated and tilted by the collimating lens 23. The collimated and tilted light beam is then incident on the air gap 20. The differences between the refractive indices of the air and of the material of which the optical coupling system 10 is made causes a first portion of the light, L1, that is incident on the air gap 20 to be refracted as it passes through the interface between the upper surface 12 of the first optical part 10a and the air gap 20. The optical coupling system 10 is made of a material that is transparent to the primary wavelength of the laser diode 2, such as Ultem® plastic, for example. The differences between the refractive indices of the air and of the material of which the optical coupling system 10 is made causes a second portion of the light, L2, that is incident on the air gap 20 to be reflected at the at the interface between the upper surface 12 of the first optical part 10a and the air gap 20. The reflected portion of the light L2 is received by the focusing lens 22 and focused thereby onto the monitor photodiode 2. The monitor photodiode 2 converts the received light into an electrical feedback signal that is processed by electrical circuitry (not shown) of the optical TX 1 to control the optical output power level of the laser diode 3.

The first portion of the light L1 is refracted again at the interface between the air gap 20 and the lower surface 13 of the second optical part 10b and propagates toward the reflective surface 25. The reflective surface 25 is typically formed to provide the effect of Total Internal Reflection (TIR). The TIR surface 25 reflects the first light portion L1 onto the focusing lens 26, which then focuses the light into the end 27a of the optical fiber 27. The first and second light portions L1 and L2 typically, but not necessarily, have about 95% and about 5%, respectively, of the optical power of the optical signal produced by the laser diode 3.

Figure 2:
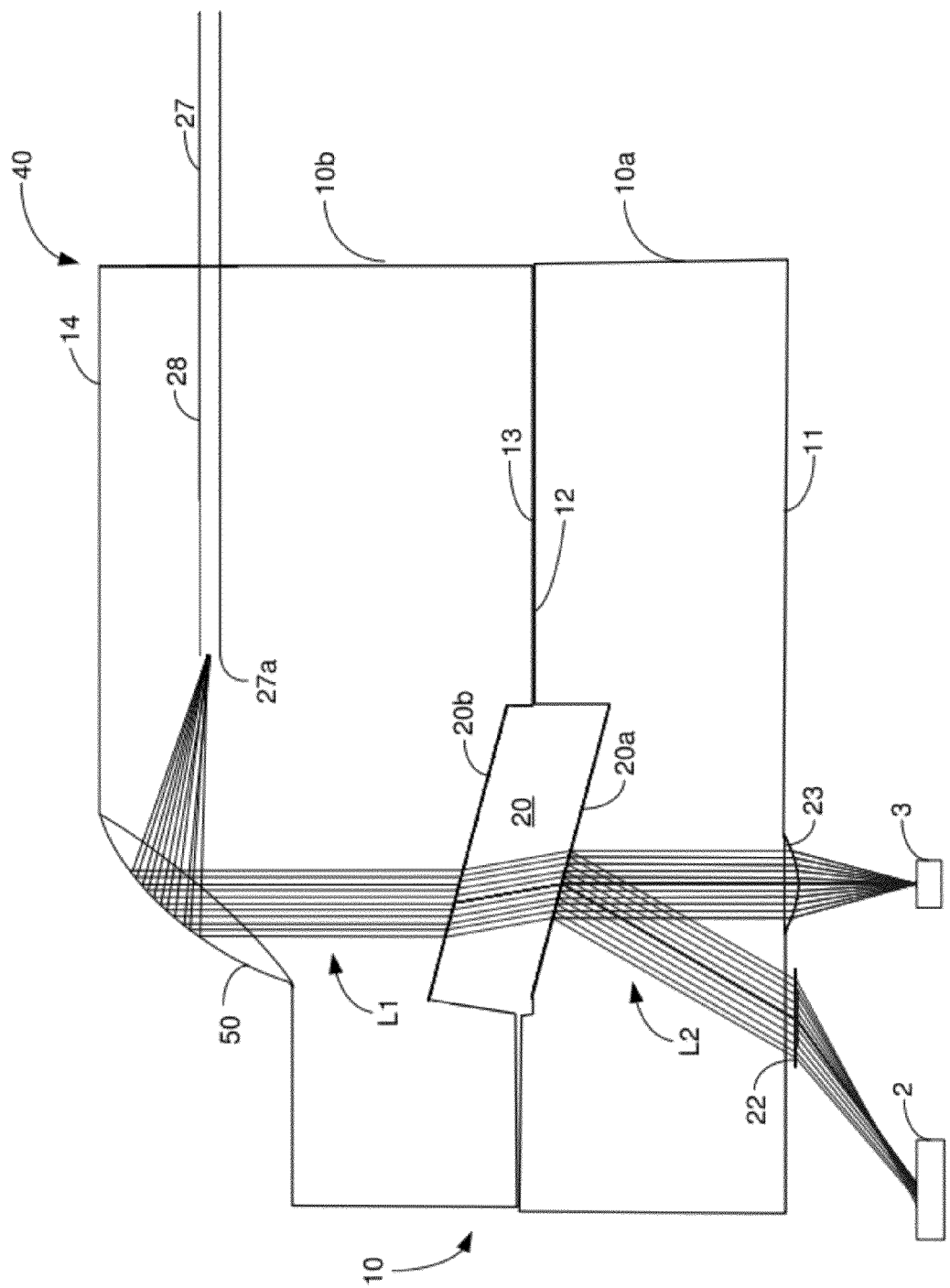
FIG. 2 illustrates a side plan view of an optical TX module that incorporates a two-part optical coupling system in accordance with another illustrative embodiment.

The configuration of the optical coupling system 10 may be varied in a number of ways. FIG. 2 illustrates a side plan view of an optical TX 40 in accordance with another illustrative or exemplary embodiment. The optical TX 40 is identical to the optical TX 1 except that the surface 25 and focusing lens 26 have been replaced with a totally internally reflective (TIR) lens 50. Like numerals in FIGS. 1 and 2 represent like components.

The optical TX 40 operates in the same manner in which the optical TX 1 operates, except with respect to the first portion of the light L1 propagating in the second optical part 10b. As the first portion of the light L1 passes from the air gap 20 into the second optical part 10b, it is refracted onto the TIR lens 50. The TIR lens 50 receives the light and reflects and focuses the light into the end 27a of the optical fiber 27. A variety of TIR lens configurations are suitable for use as the TIR lens 50. For example, a variety of biconic lenses may be used for this purpose.

The optical coupling system 10 shown in FIGS. 1 and 2 is typically manufactured using an injection molding process. The injection molding process uses molds that have the shapes of the upper and lower surfaces 12 and 13 of the first and second optical parts 10a and 10b, respectively. Therefore, no extra steps need to be taken in order to form the indentations 20a and 20b in the first and second optical parts 10a and 10b, respectively. Consequently, the indentations 20a and 20b are formed without incurring any additional manufacturing costs.

It should be noted that the invention has been described with respect to illustrative embodiments for the purpose of describing the principles and concepts of the invention. The invention is not limited to these embodiments. For example, while the invention has been described with reference to using a particular optical TX configuration, the invention is not limited to this particular configuration. Also, the invention is not limited to the optical coupling system having the configuration shown in FIGS. 1 and 2. For example, the shape of the air gap 20 is not limited to the shape shown in FIGS. 1 and 2. Also, the indentations 20a and 20b need not be formed in both surfaces 12 and 13, but may be formed in either of the surfaces 12 and 13, provided the resulting air gap has the shape necessary to provide the necessary amount of refraction and reflection. The invention is not limited with respect to the type of transparent material that is used for the optical coupling system. As will be understood by those skilled in the art in view of the description being provided herein, many modifications may be made to the embodiments described herein without deviating from the goals of the invention, and all such modifications are within the scope of the invention.

What is claimed is:

1. A two-part optical coupling system for use in an optical transmitter (TX) module, the two-part optical coupling system comprising:
   a first optical part having at least an upper surface and a lower surface, the first optical part comprising a material that is transparent to a primary wavelength of a laser diode of the optical TX module, the upper surface having an indentation formed therein; and
   a second optical part having at least an upper surface and a lower surface, the second optical part comprising a material that is transparent to the primary wavelength of the laser diode of the optical TX module, the lower surface of the second optical part being in contact with the upper surface of the first optical part such that an air gap exists where the indentation formed in the upper surface of the first optical part interfaces with the lower surface of the second optical part, and wherein a first portion of light, L1, produced by the laser diode is refracted by the air gap and wherein a second portion of the light, L2, produced by the laser diode is reflected by the air gap, the second portion of light L2 being coupled by the two-part optical coupling system onto a monitor photodiode of the optical TX module, the first portion of the light L1 being coupled by the two-part optical coupling system into an end of an optical fiber.

2. The two-part optical coupling system of claim 1, wherein the lower surface of the second optical part has an indentation formed therein, and wherein the indentations formed in the upper and lower surfaces of the first and second optical parts, respectively, overlap to form the air gap.

3. The two-part optical coupling system of claim 2, wherein the first and second optical parts are made of a molded plastic material.

4. The two-part optical coupling system of claim 1, further comprising:
   a collimating lens disposed on the lower surface of the first optical part, the collimating lens collimating the light produced by the laser diode and directing the collimated light onto the air gap; and
   a focusing lens disposed on the lower surface of the first optical part, the focusing lens receiving the reflected second light portion L2 and focusing the reflected second light portion L2 onto the monitor photodiode.

5. The two-part optical coupling system of claim 4, further comprising:
   a reflector disposed on the upper surface of the second optical part, the reflector receiving the first light portion L1 refracted by the air gap and reflecting the refracted first light portion L1; and
   a focusing lens disposed on the upper surface of the second optical part, the focusing lens disposed on the upper surface of the second optical part focusing the light reflected by the reflector into the end of the optical fiber.

6. The two-part optical coupling system of claim 4, further comprising:
   a totally internally reflective (TIR) lens disposed on the upper surface of the second optical part, the TIR lens receiving the first light portion L1 refracted at the interface of the air gap and the upper surface of the first optical part and reflecting the refracted first light portion L1 and focusing the reflected first light portion L1 into the end of the optical fiber.

7. A two-part optical coupling system for use in an optical transmitter (TX) module, the two-part optical coupling system comprising:
   a first optical part having at least an upper surface and a lower surface, the first optical part comprising a material that is transparent to a primary wavelength of a laser diode of the optical TX module; and
   a second optical part having at least an upper surface and a lower surface, the second optical part comprising a material that is transparent to the primary wavelength of the laser diode of the optical TX module, the lower surface of the second optical part having an indentation formed therein, the lower and upper surfaces of the second and first optical parts, respectively, being in contact with each other such that an air gap exists where the indentation formed in the lower surface of the second optical part interfaces with the upper surface of the first optical part, and wherein a first portion of light, L1, produced by the laser diode is refracted by the air gap and wherein a second portion of the light, L2, produced by the laser diode is reflected by the air gap, the reflected second portion of light L2 being coupled by the two-part optical coupling system onto a monitor photodiode of the optical TX module, the refracted first portion of the light L1 being coupled by the two-part optical coupling system into an end of an optical fiber.

8. The two-part optical coupling system of claim 7, wherein the upper surface of the first optical part has an indentation formed therein, and wherein the indentations formed in the upper and lower surfaces of the first and second optical parts, respectively, overlap to form the air gap.

9. The two-part optical coupling system of claim 8, wherein the first and second optical parts are made of a molded plastic material.

10. The two-part optical coupling system of claim 7, further comprising:
    a collimating lens disposed on the lower surface of the first optical part, the collimating lens collimating the light produced by the laser diode and directing the collimated light onto the air gap; and
    a focusing lens disposed on the lower surface of the first optical part, the focusing lens receiving the second light portion L2 and focusing the second light portion L2 onto the monitor photodiode.

11. The two-part optical coupling system of claim 10, further comprising:
    a reflector disposed on the upper surface of the second optical part, the reflector receiving the first light portion L1 refracted by the air gap and reflecting the refracted first light portion L1; and
    a focusing lens disposed on the upper surface of the second optical part, the focusing lens disposed on the upper surface of the second optical part focusing the light reflected by the reflector into the end of the optical fiber.

12. The two-part optical coupling system of claim 10, further comprising:
    a totally internally reflective (TIR) lens disposed on the upper surface of the second optical part, the TIR lens receiving the first light portion L1 refracted by the air gap and reflecting and focusing the first light portion L1 into the end of the optical fiber.

13. A method of using a two-part optical coupling system in an optical transmitter (TX) module to provide optical feedback, the method comprising:
    providing a two-part optical coupling system having first and second optical parts, each of the first and second optical parts having at least an upper surface and a lower surface, the first and second optical parts comprising a material that is transparent to a primary wavelength of a laser diode of the optical TX module, wherein at least one of the upper and lower surfaces of the first and second optical parts, respectively, has an indentation formed therein, and wherein the upper and lower surfaces of the first and second optical parts, respectively, are in contact with each other such that the indentation forms an air gap in the optical coupling system, wherein the first and second optical parts comprise a material that is transparent to a primary wavelength of a laser diode of the optical TX module;

with the laser diode of the optical TX module, producing light of the primary wavelength;

directing the light produced by the laser diode onto the air gap, wherein a first portion of the light, L1, produced by the laser diode is refracted by the air gap, and wherein a second portion of the light, L2, produced by the laser diode is reflected at the air gap;

coupling the reflected second portion of light L2 onto a monitor photodiode of the optical TX module; and coupling the refracted first portion of the light L1 being coupled by the two-part optical coupling system into an end of an optical fiber.

14. The method of claim 13, wherein the first and second optical parts are made of a molded plastic material.

15. The method of claim 1, further comprising:

with a collimating lens disposed on the lower surface of the first optical part, collimating the light produced by the laser diode and directing the collimated light onto the air gap, the refracted first portion of the light L1 corresponding to collimated light directed onto the air gap by the collimating lens that is refracted by the air gap; and with a focusing lens disposed on the lower surface of the first optical part, receiving the second light portion L2 reflected by the air gap and focusing the second light portion L2 onto the monitor photodiode.

16. The method of claim 15, further comprising:

with a reflector disposed on the upper surface of the second optical part, receiving the first light portion L1 refracted by the air gap and reflecting the refracted first light portion L1; and with a focusing lens disposed on the upper surface of the second optical part, focusing the light reflected by the reflector into the end of the optical fiber.

17. The method of claim 15, further comprising:

with a totally internally reflective (TIR) lens disposed on the upper surface of the second optical part, receiving the refracted first light portion L1 and reflecting and focusing the reflected first light portion L1 into the end of the optical fiber.

* * * * *